United States Patent [19]

McKavanagh

[11] Patent Number: 5,330,156

[45] Date of Patent: Jul. 19, 1994

[54] SEAL ARRANGEMENT FOR VALVES

[76] Inventor: Thomas P. McKavanagh, 14924 Yong Street, Suite 602, Aurora, Ontario, Canada, L4G 6H7

[21] Appl. No.: 930,312

[22] Filed: Aug. 17, 1992

Related U.S. Application Data

[63] Continuation-in-part of Ser. No. 793,526, Nov. 18, 1991, Pat. No. 5,150,881.

[51] Int. Cl.$^5$ .................... F16K 25/00; F16K 41/04
[52] U.S. Cl. .................... 251/159; 251/161; 251/173; 251/174; 251/175; 251/214; 251/306; 277/27; 277/164
[58] Field of Search ............... 251/160, 174, 175, 214, 251/305, 306, 161, 173; 277/27, 200, 205, 206 R, 164, 213, 235 R

[56] References Cited

U.S. PATENT DOCUMENTS

| | | | |
|---|---|---|---|
| 926,841 | 7/1909 | Bartlett | 277/235 R |
| 1,914,741 | 6/1933 | Gysling | 277/27 |
| 3,403,917 | 10/1968 | MacSpadden, Jr. | 277/200 |
| 3,427,034 | 2/1969 | Lowe | 277/200 |
| 3,443,814 | 5/1969 | Dahlheimer | 277/27 |
| 3,649,032 | 3/1972 | Nelson | 277/235 R |
| 3,737,139 | 6/1973 | Watts | 277/235 R |
| 3,970,321 | 7/1976 | Dechavanne | 277/27 |
| 4,140,147 | 2/1979 | Van't Sant | 251/306 |
| 4,154,426 | 5/1979 | Santy et al. | 251/306 |
| 4,256,314 | 3/1981 | Berglund et al. | 277/27 |
| 4,411,439 | 10/1983 | Couvillion et al. | 277/27 |
| 4,632,403 | 12/1986 | Ishitani et al. | 277/27 |
| 4,854,600 | 8/1989 | Halling et al. | 277/200 |

FOREIGN PATENT DOCUMENTS

| | | | |
|---|---|---|---|
| 856977 | 12/1957 | United Kingdom | 277/27 |
| 1025884 | 4/1966 | United Kingdom | 277/27 |

Primary Examiner—George L. Walton

[57] ABSTRACT

A sealing arrangement for a valve or shaft is disclosed which is designed to respond to movements of a rotatable element in a particular manner and to increase sealing pressure with increasing fluid pressure. The seal undergoes a radial compressive type movement as the pressure within a vessel housing increases between opposed sealing sleeves and this causes an increase in the sealing pressure. This predetermined movement of the seal creates a spring bias in the seal, urging the seal to return to the original, less stressed condition. Preferably, the seal is of a composite structure and a particular component of the intermediate wall section creates this spring bias. This structure has improved operating characteristics and accommodates a wider range of resilient materials to be used for the sealing washer.

20 Claims, 7 Drawing Sheets

SEAL ARRANGEMENT FOR VALVES

CROSS-REFERENCE TO RELATED APPLICATIONS

This application is a continuation-in-part of Ser. No. 07/793 526 filed Nov. 18, 1991 U.S. Pat. No. 5,510,881.

FIELD OF THE INVENTION

The present invention relates to sealing arrangements and in particular, an improved sealing arrangement for movable shafts and valve elements.

BACKGROUND OF THE INVENTION

A particular gate valve sleeve is taught in U.S. Pat. No. 4,895,181. The sleeve disclosed in this patent uses a stiffening ring enclosed within the sleeve. Other arrangements for gate valve sleeves are disclosed in U.S. Pat. No. 4,257,447 (Clarkson), U.S. Pat. No. 2,873,943 (Williams), U.S. Pat. No. 3,659,822 (Nagi), U.S. Pat. No. 4,201,365 (Paptzun et al), U.S. Pat. No. 4,603,864 (Raftis), U.S. Pat. No. 4,623,122 (Gambetta), and U.S. Pat. No. 4,625,942 (Nelson).

In most cases, the gate valve includes an internal sleeve arrangement made of a rubber type material which resiliently distorts upon movement of the gate of the gate valve between the sealing member and returns to seal with a like seal member when the gate is fully withdrawn.

Gate valves are subject to widely varying operating conditions and preferably must satisfactorily operate under these widely varying conditions. For example, the gate valve could be opened and closed several times daily and, therefore, must be capable of opening and closing effectively. In other cases, the gate valve may be left in one position for a substantial period of time and then moved to a second position. The sleeve of the gate valve must be capable of responding to these changing conditions and any tendency of the material of the sleeve to maintain a particular set should be minimal. Other factors affecting the choice of the sealing material include the abrasiveness of the material being conveyed through the pipe, the temperature of the fluid, and the corrosiveness of the fluid.

These factors are also true with respect to seals about shafts including shafts of valves as well as other valve elements such as butterfly valve elements.

In the past, there has been a tendency to find an elastomeric material or composite material which effectively addresses the widely varying characteristics for the sealing element. In the case of U.S. Pat. No. 4,895,181, the rigidity adjacent the sealing end of the sleeve was improved by embedding directly therein a stiffening ring. Unfortunately, the widely varying operating conditions in combination with the material to be carried renders the choice of material for the sealing sleeve or sealing arrangement very difficult. There remains a need to provide a simple sealing sleeve arrangement which is capable of operating under widely varying conditions.

SUMMARY OF THE INVENTION

The present invention is an improved seal element for a rotatable member having a seal surface associated therewith. The seal arrangement is particularly for use in sealing a shaft as it passes through a valve or vessel housing. The seal element is a washer type seal having a resilient body portion having a forward face and a rearward face with the rearward face cooperating with the valve or vessel housing or a rotatable member to define a low pressure cavity therebetween. The forward face is exposed to fluid pressure within the housing, such that when the pressure within the housing exceeds the cavity pressure, distortion of the washer occurs in a manner to flatten the washer and reduce the size of the low pressure cavity. The washer includes a biasing member which opposes the tendency to flatten the washer and directs some of the force thereof to increase the sealing pressure in a radial manner.

According to an aspect of the invention, the rotatable member is a valve stem and the washer type seal cooperates with the valve housing to define the low pressure cavity. The housing engages and locates the periphery of the resilient body with an inner sealing periphery engaging the valve stem. The inner sealing periphery is biased by the biasing member to exert a sealing pressure between the inner sealing periphery and the valve stem which increases as fluid pressure exerted on the washer increases.

According to a further aspect of the invention, the rotatable member is a butterfly element and the washer is secured to the butterfly element on an upstream side thereof. The butterfly element and washer in a closed position cooperate such that fluid pressure exerted on the washer is transformed by the biasing member to force an outer sealing periphery of the washer into a higher pressure sealing engagement with the valve housing when the butterfly element is in a closed position.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
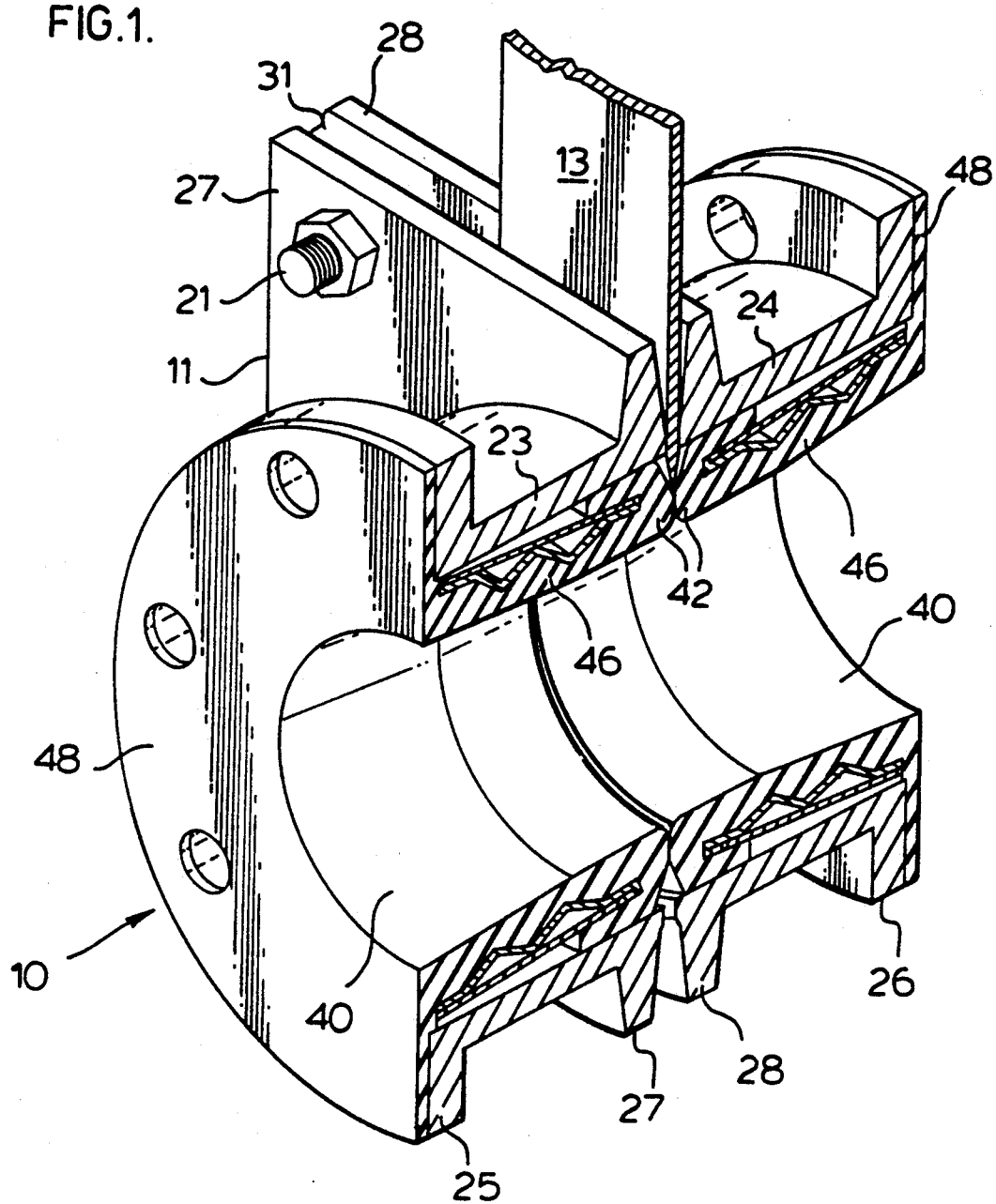
FIG. 1 is a perspective cutaway of a gate valve assembly.

A gate valve, generally shown as 10 in FIG. 1, includes a housing 11 made up of opposed housing halves 23 and 24. The housing halves have opposed interior flanges 27 and 28 which are spaced from one another by spacer strips 31. This defines a central gap through which the plate gate 13 can move up or down to either open or restrict the passageway through the gate valve. The opposed housing halves 23 and 24 are secured together by a plurality of nut and bolt arrangements, generally shown as 21. A sealing sleeve, generally shown as 40, is associated with each housing half 23 and 24. These sealing sleeves include a sealing end portion 42, an intermediate section 46 which is the section which will accommodate compressive movement of the sleeve when the plate gate 13 is moved between the sealing sleeves, and an anchoring flange 48. The anchoring flange 48 not only anchors the sleeve, but forms a gasket for sealing with pipe flanges when the outer circular flanges 25 and 26 are brought into engagement with opposed pipe flanges. A flanged anchoring end is shown, but other anchoring ends can be used, depending upon the structure of the gate valve.

Figure 2:
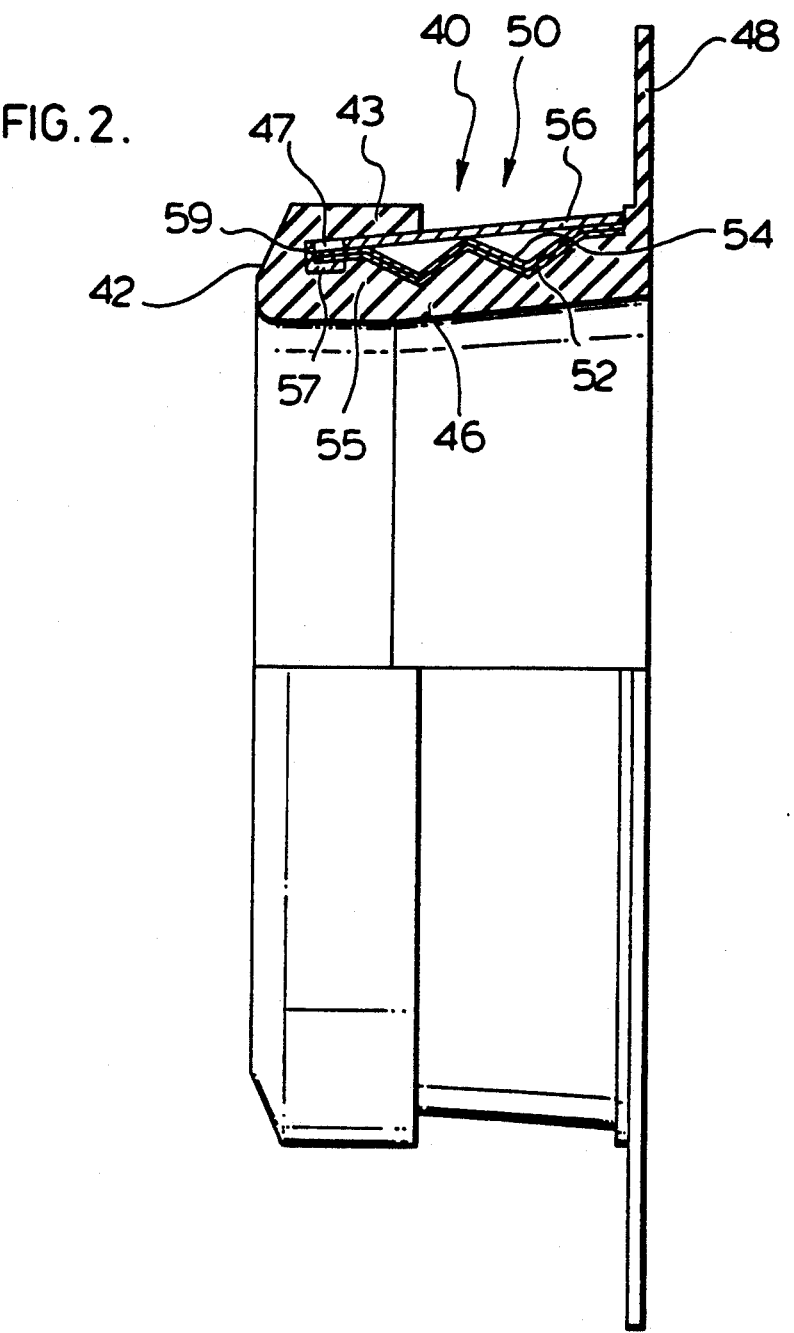
FIG. 2 is a side view, partial cutaway of the cylindrical type sleeve.

The structure of the particular sealing sleeve is shown in FIG. 2. The upper portion of FIG. 2 shows a cutaway of the sealing member and the lower portion shows the entire sealing member. It can be appreciated that when the gate 13 is in a cleared position, sealing ends 42 of opposed sealing sleeves 40 abut and form a seal therebetween. As the gate 13 is moved between the sealing sleeves, each sealing sleeve undergoes a compressive distortion movement to accommodate the thickness of the gate 13. To accommodate the compressive distortion movement required of the sealing sleeve 40, the intermediate section has been provided with a spring collar 50.

Figure 3:
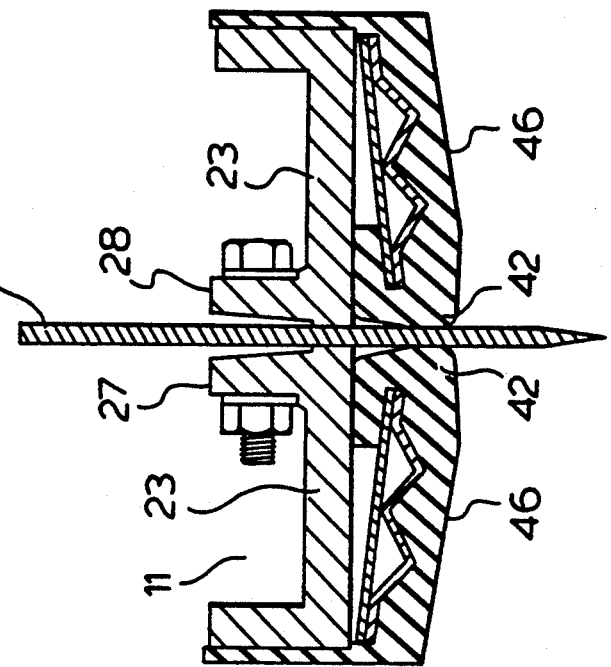
FIGS. 3 and 4 are sectional views through a gate valve with the valve in the open or closed position.
Figure 4:
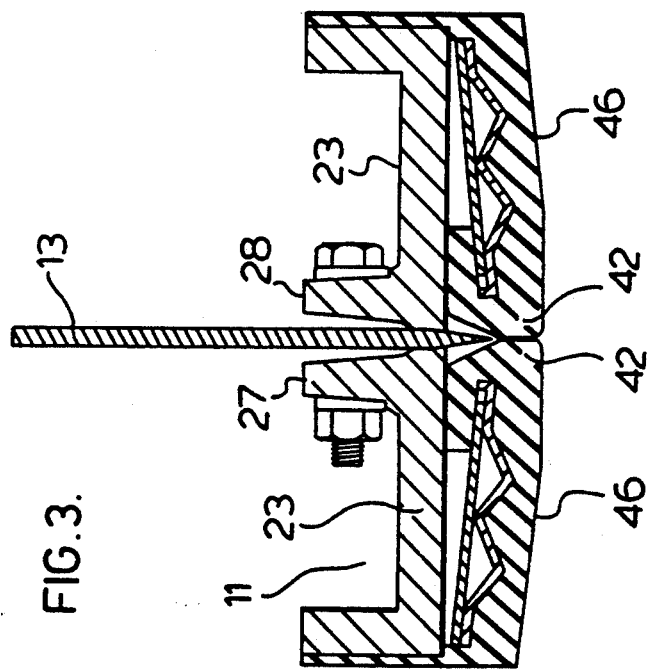
Figure 7:
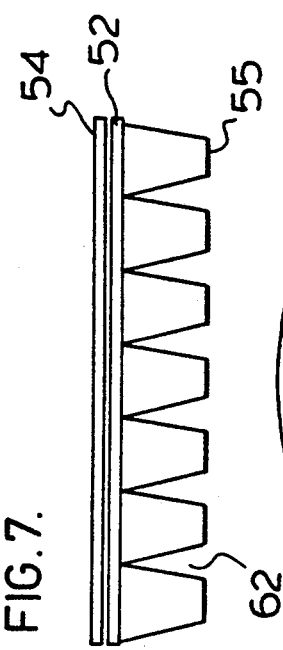
FIG. 7 is a side view of the spring collars of FIG. 6.
Figure 8:
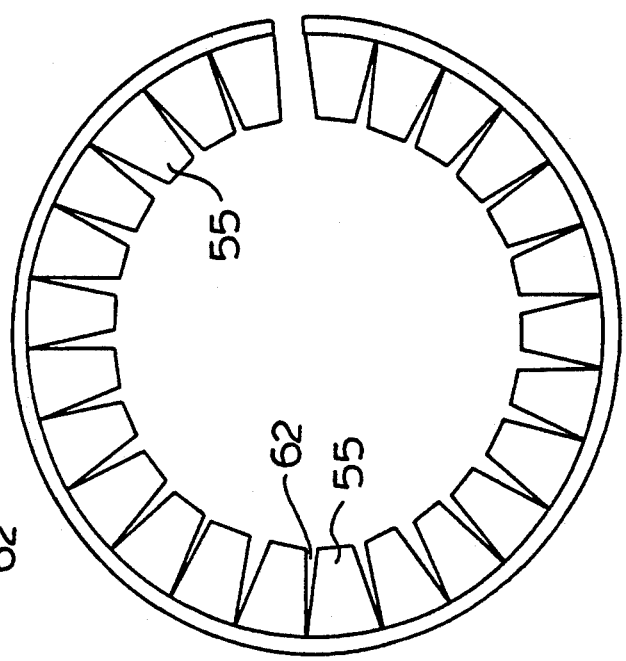
FIG. 8 shows the spring collars of FIGS. 6 and 7 deformed into a circular band.
Figure 6:
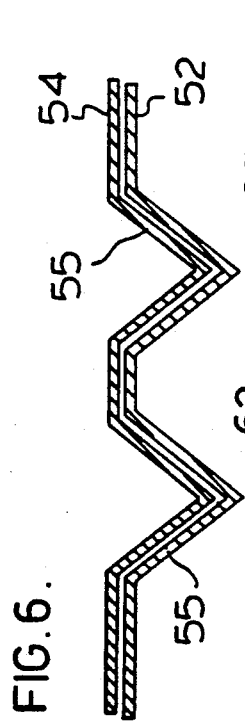
FIG. 6 is a sectional view of two spring collars of the type shown in FIG. 5.
Figure 5:
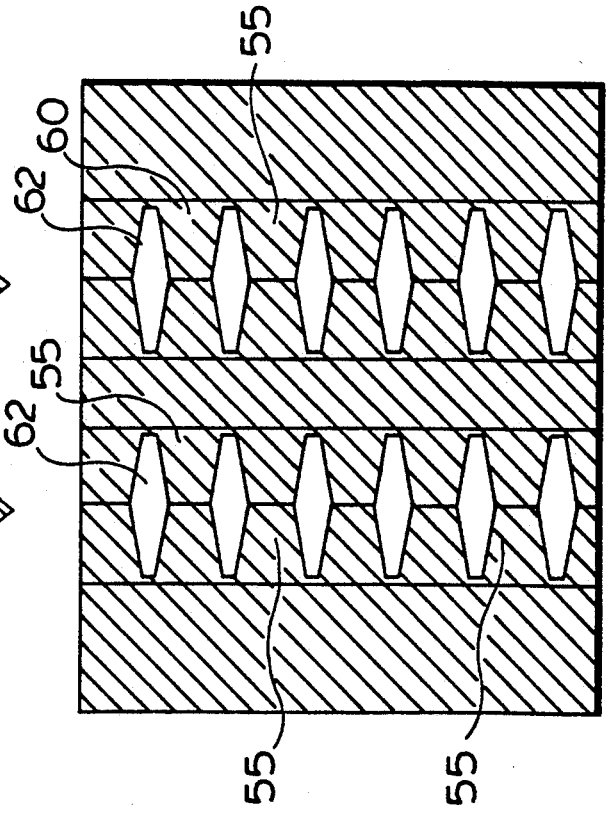
FIG. 5 is a top view of a spring collar prior to being formed into a cylindrical shape.

FIG. 3 shows the sealing sleeve with the gate 13 fully withdrawn, with FIG. 4 illustrating the movement of the sealing sleeve with the gate partially closed.

In the embodiment shown in FIG. 2, two metal members 52 and 54 are provided in back-to-back relationship and have a corrugated center portion defined by aligned 'V' shaped portions 55. Each of these 'V' shaped portions produce a spring type bias during compression of the intermediate section and cause an inward buckling of the intermediate section such that the intermediate section distorts radially inwardly, as shown in FIG. 4. This radial inward distortion is preferable, as it will be opposed by the pressure of the fluid within the seal which, again, will create a strong bias trying to return the seal to its original position.

To further ensure the inward buckling of the intermediate section, a stiff backing member 56 can be provided to avoid outward buckling of the intermediate section. The use of this backing member may be required in larger sleeves. The backing member 56 is received within the walls of the sleeve and a small space is provided to allow movement of the intermediate section and the end seal without compressive forces being applied axially to the backing member 56. The backing member also serves to stiffen the sleeve to avoid inward collapse of the sleeve during movement of the gate.

It can be seen with this arrangement that the compressible spring collar 50 opposes axial compression or distortion of the sealing sleeve 40 and provides a strong bias urging the sealing sleeve to return to its original condition. It can also be seen that the spring collar 50 is positioned between the anchoring flange 48 and the sealing end 42 to direct the compressive force towards the portion of the sealing end 42 effecting a seal either with the gate or a like sealing end of an opposed sealing sleeve. The seal end also includes a force distributing plate 57 such that end 59 of spring collar 50 does not cut through the sealing end 42. This force distributing plate 57 can be made integral with end 59 if desired. A similar force distributing arrangement can be provided adjacent the anchoring end, if required.

The spring collar 50 is easily inserted within the sealing sleeve due to the end seal 42 including a flange 43 defining a closed pocket 47 between the intermediate section 46 and the flange 43 into which one end of the backing member 56 and the spring collars 52 and 54 are inserted and maintained. The other end of the backing member and the spring collars are appropriately anchored adjacent the anchoring flange 48. Thus, these members can be inserted into the resilient body of the sealing sleeve 40.

As can be appreciated from the above, the inward buckling of the intermediate section, which is predetermined by the shape and relationship with the spring collar 50, advantageously uses the fluid pressure between the sealing sleeve to oppose this inward buckling and create a further force encouraging an effective seal with either the gate valve or with an opposed sealing end of a further sleeve. This fluid pressure creating a bias in combination with the mechanical bias created by the spring collar makes the response of the sealing sleeve positive and does not rely on the inherent resiliency of the rubber type sealing material of conventional sealing sleeves. As the pressure of the fluid increases, a larger sealing force is created.

The backing member, generally shown in FIG. 2, will preferably be of a ring configuration to provide the backing to the spring collar 52 and 54.

One type of spring collar is shown in FIGS. 5 through 8. In this case, the spring collars are preferably made in a flat configuration and have 'V' shaped portions 55 which can be deformed into the flat material in a conventional manner. The 'V' shaped portions include gaps 62 to allow the flat members shown in FIG. 5 to be deformed into the generally circular-like configuration of FIG. 8 and also accommodate any inward buckling of the intermediate section during movement of the gate 13 and allow the sections to function generally independently of the adjacent 'V' shaped portions. Preferably, the spring collar will then be secured in some suitable manner for insertion within the sealing sleeve. Although the spring collar is preferably made of a metal material, it could also be made of a plastic material and possibly could be of an extruded plastic material which is subsequently cut or punched to produce the gap 62. It can also be appreciated that the spring collar could be injected moulded. Gaps 62 are preferably retained to allow the individual segments of the spring collar to act independently and accommodate gate movement. The spring collar could also be formed in axial strips which collectively form a collar type member. These axial strips could collectively form a ring or merely be spaced in a ring pattern. Each strip would create its own bias and respond to movement of the gate in the same manner.

It is believed that the combination of a resilient rubber-like material for the end seal and for the body portion of the intermediate section and for the anchoring and in combination with a spring collar, shaped to produce a particular deformation and preferably a radially inward buckling of the intermediate section, produces an effective system which can be manufactured at costs very similar to conventional sleeves while providing more positive sealing and more ability to satisfy the widely varying operating conditions of a gate valve.

The combination of the created mechanical force and the resilient material of the sleeve simplifies the selection of the resilient material and allows more exotic, highly temperature resistant and/or chemical resistant materials to be used, as the other desired properties are provided by the spring bias. For example, the intermediate can have only a thin section of resilient material effectively covering the spring collar, with the spring collar urging the seal to the less stressed state during withdrawal of a gate. This thin wall also accommodates inward buckling of the intermediate section.

Two alternate embodiments of the invention are shown in FIGS. 9 through 12.

Figure 9A:
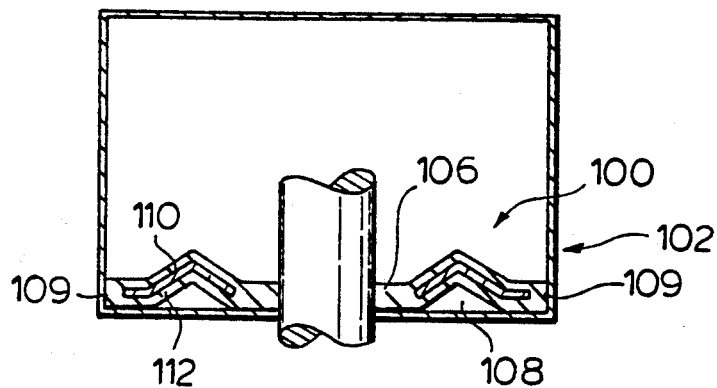
FIG. 9A and 10A are sectional views of the washer sealing about a shaft supported in a housing under nominal pressure in FIG. 9A and under increasing pressure in FIG. 10A.
Figure 9B:
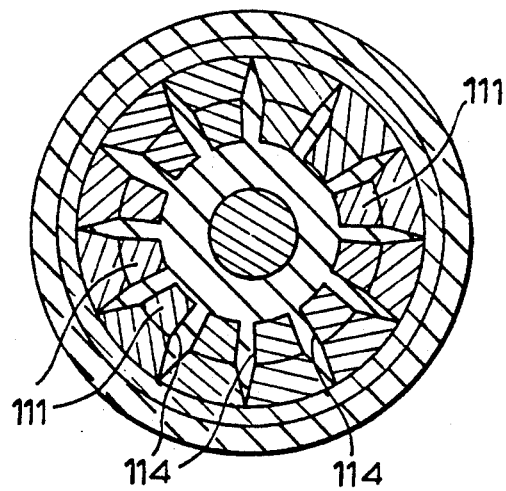
FIGS. 9B and 10B are end views of the washer and housing under nominal and increasing pressure, respectively.
Figure 10A:
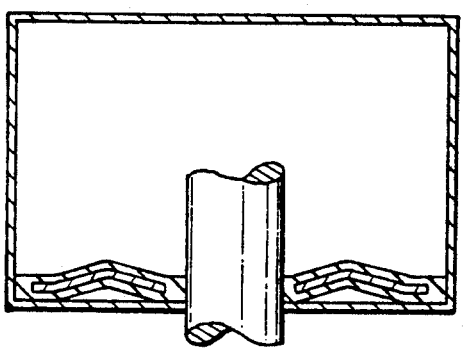
Figure 10B:
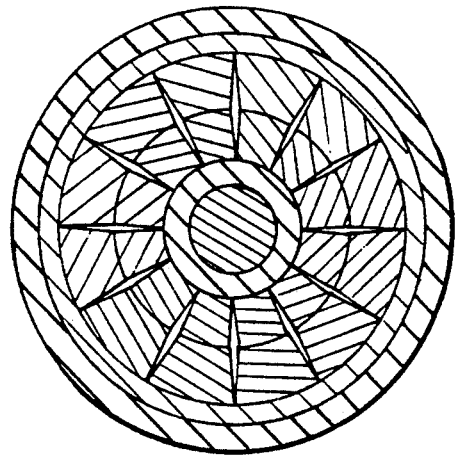

In FIG. 9A, a washer type seal 100 is located within the vessel or valve housing 102 and sealingly engages the rotatable shaft 104. In particular, the inner peripheral seal portion 106, which can be of a resilient rubber type material, sealingly engages about the shaft. A low pressure cavity 108 is defined between the vessel housing 102 and the washer type seal 100. Within the washer is a metal or other structural type member 110 which is distorted or bowed inwardly and partially defines the low pressure cavity 108. A flat metal buckling member can close the bottom of the cavity for certain applications and helps to maintain the integrity of the cavity and allow the desired action of member 110 exposed to the differential pressure. This metal portion is encased, preferably within a resilient rubber type material, and is located between an outer peripheral portion 109 engaging the housing 102 and the inner peripheral sealing portion 106. The metal distorted or bowed portion 110 is made up of multiple sections 111 shown in FIG. 9B, and allow compression of the seal, gaps 114 are provided between the multiple sections. The vessel, as shown in FIGS. 9A and 9B, is under nominal or zero pressure, whereas the vessel housing in FIGS. 10A and 10B is the same as in FIG. 9, however, the pressure has been increased. As can be seen, a distortion has occurred due to the pressure being exerted on the upstream side of the valve and particularly on the upstream side of the washer defined by the bowed or distorted portion 110. This increased pressure has forced the bowed or distorted portion to flatten or partially flatten to the position shown in FIG. 10. As can be seen, the low pressure on the back side of the washer within cavity 108 cannot oppose the higher fluid pressure. With this distortion, there has been increased pressure exerted by the inner sealing portion 106 against the shaft stem and, therefore, with increasing pressure within the vessel housing, an increasing sealing pressure occurs. As can be seen in FIG. 10B, the multiple sections 111 have flattened and the gaps 114 that were between the sections previously are no longer present due to the inward movement of the multiple sections and as a result of the decreasing diameter with this inward movement. As the fluid pressure decreases, the sealing pressure decreases and the strain on the washer is reduced.

Figure 11A:
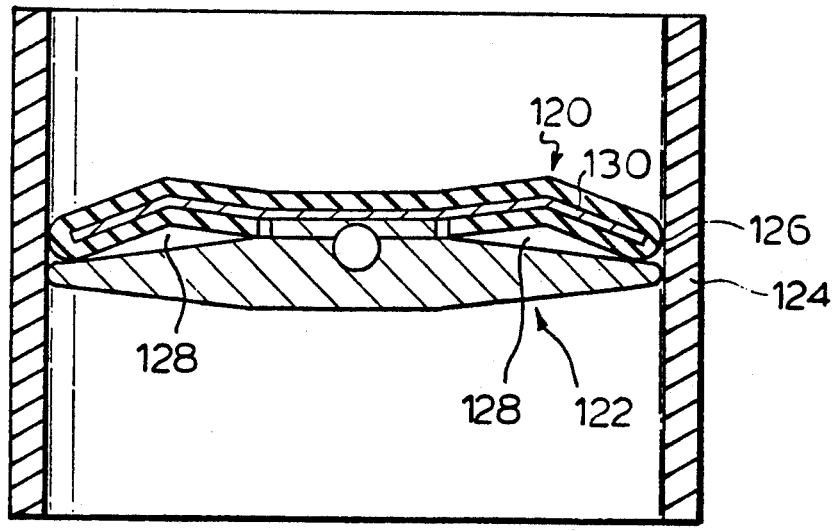
FIGS. 11A and 12A are sectional views of the washer secured in a butterfly valve under nominal and increasing pressure, respectively.
Figure 11B:
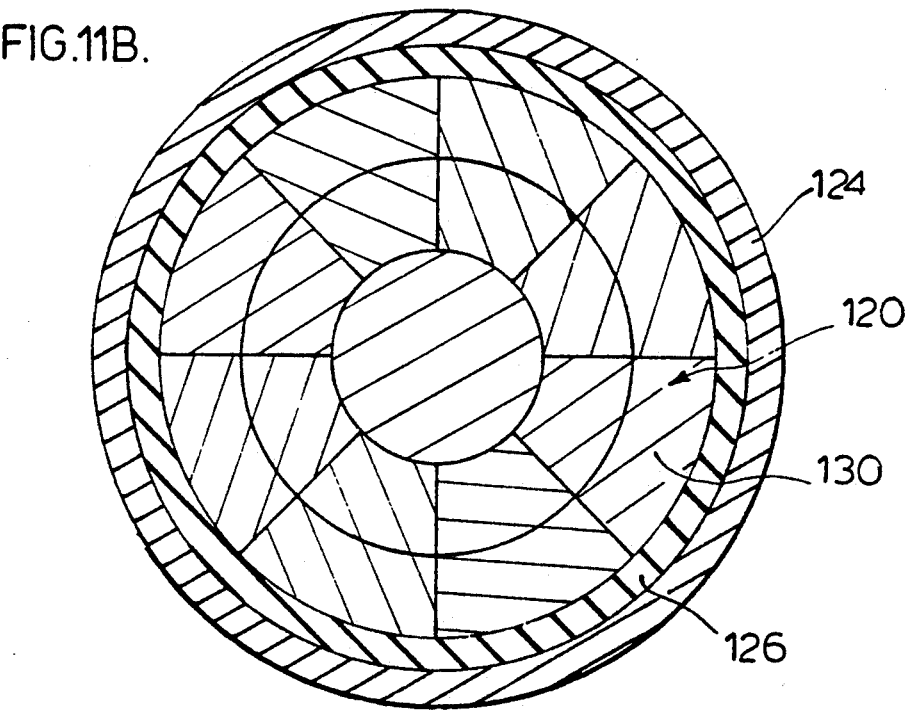
FIGS. 11B and 12B are end views of the butterfly valves of FIGS. 11A and 12A, respectively.
Figure 12A:
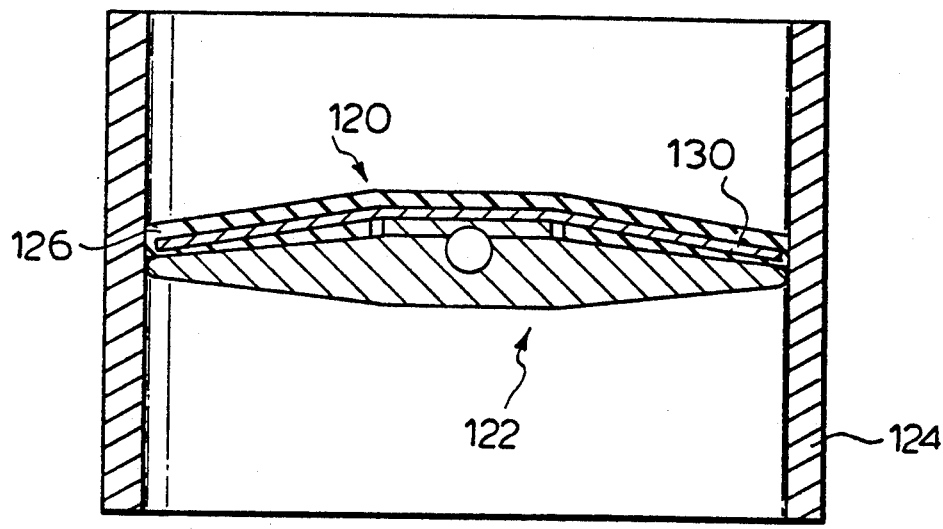
Figure 12B:
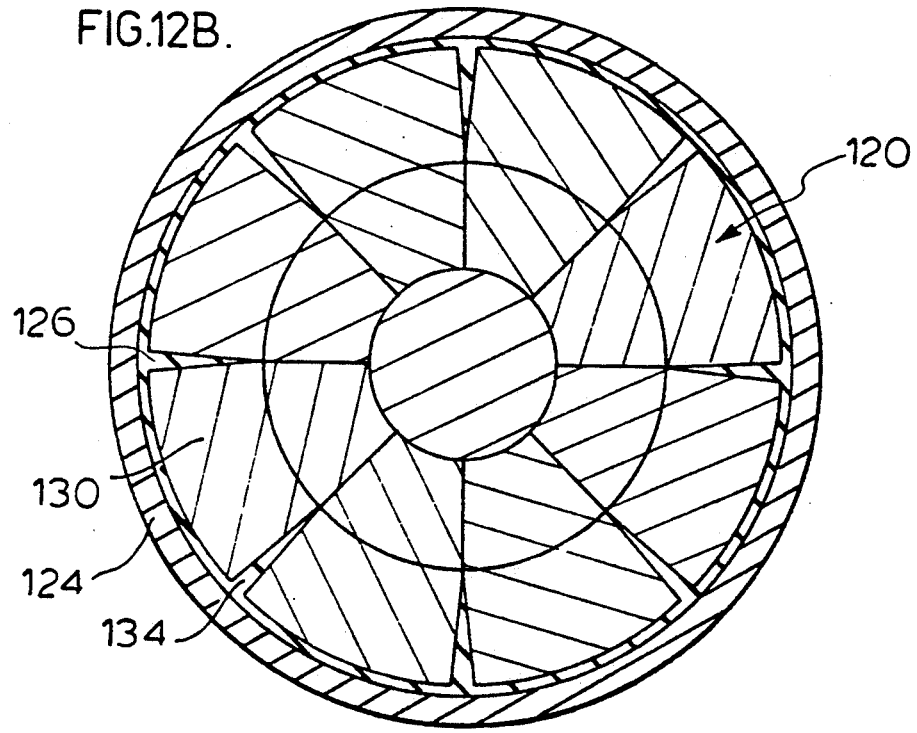

A yet further embodiment of the invention is shown in FIGS. 11 and 12. In this case, a washer type seal 120 has been secured to the butterfly valve element 122 on the upstream side of the valve element. The valve housing in this case is a tubular section, shown as 124, and the outer peripheral sealing portion 126 of the washer type seal 120 engages the valve housing when the butterfly element is in the closed position, as shown in FIGS. 11A and 11B. A low pressure cavity 128 is provided between the butterfly element and the washer type seal 120. If necessary, the washer type seal 120 can include a portion which directly engages the butterfly element and effectively seals the low pressure cavity 128 from the fluid passing through the valve housing. In this way, the low pressure within the low pressure cavity 128 can be maintained.

As shown in FIG. 11B, the inner portion of the washer type seal 120 is secured to the butterfly element. The distorted or bowed portions 130 of the seal have moved in a flattening direction due to the high fluid pressure and the outer peripheral seal portion 126 is forced outwardly against the valve housing 124. Again, there are multiple sections 132, but in this case, gaps 134 are produced when increased pressure occurs and these multiple sections 132 effectively move outwardly, causing increasing pressure of the outer peripheral portion 126 with the valve housing 124.

With the embodiments of FIGS. 11 through 12, it is possible to select the best material for effecting a seal with the valve housing, or in the embodiment of FIGS. 9 and 10, to select the best material for effecting a seal with respect to the shaft, while also selecting the desired material interior to the washer to encourage an increasing sealing force with increasing pressure within the valve. Thus, this composite structure allows increased flexibility with respect to the design of the seal and customizing of the seal for particular applications. Furthermore, the structure of the seal is relatively simple and easy to manufacture.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A seal arrangement comprising in combination, a vessel housing exposed to fluid pressure, a rotatable element having a sealing surface located within said vessel housing and a washer type seal located within said vessel housing; said washer type seal having a generally resilient body portion having a forward face and a rearward face having an inner exposed sealing face therebetween in contact with said sealing surface of said rotatable element, said forward face being exposed to fluid pressure within said housing, said rearward face cooperating with said vessel housing to define a low pressure cavity therebetween whereby different pressure differentials are created when said forward face is exposed to different fluid pressures within the vessel housing, exceeding the pressure of the low pressure cavity; said washer including a mechanical biasing arrangement of a material different than said resilient body located between the forward face and the rearward face and extending along a length thereof said mechanical biasing arrangement, when exposed to any of the pressure differentials resiliently distorts along said length thereof and moves in a predetermined directed manner towards said sealing face and thereby exerts a greater force on said sealing face increasing the sealing effect between said sealing face and said sealing surface of said rotatable element, such that the sealing effect increases as the biasing arrangement continues to distort along said length thereof in the predetermined directed manner caused by increases in the fluid pressure exposed to said forward face, said mechanical biasing arrangement being selected to determine the sealing effect at any of the pressure differentials.

2. A seal arrangement as claimed in claim 1 wherein said rotatable element is a shaft and said vessel housing engages and locates an outer periphery of said resilient body.

3. A seal arrangement as claimed in claim 2 wherein said biasing arrangement has bowed or distorted sections which cooperate with the low pressure cavity to distort in a direction to flatten said bowed or distortion section and thereby increase the sealing effect between said inner sealing face and said shaft when said forward face is exposed to increasing fluid pressure.

4. A seal arrangement as claimed in claim 1 wherein said vessel housing is a valve housing and said rotatable element is a valve element.

5. A seal arrangement as claimed in claim 4 wherein said mechanical biasing arrangement is embedded in said resilient body.

6. A seal arrangement as claimed in claim 1 wherein said mechanical biasing arrangement is made up of a multiplicity of separate finger sections radially disposed about said washer type seal.

7. A seal arrangement as claimed in claim 6 wherein said mechanical biasing arrangement is embedded in said resilient body.

8. A seal arrangement as claimed in claim 6 wherein said finger sections of said mechanical biasing arrangement are of metal, which, in an unstressed state of said washer type seal, have said bowed or distorted sections shaped as a 'V' shape.

9. A seal arrangement as claimed in claim 8 wherein said lower pressure cavity is interior to said washer and is partially defined by a flat metal portion opposite said mechanical biasing arrangement with said low pressure cavity being located between said mechanical biasing arrangement and said flat metal portion.

10. A seal arrangement as claimed in claim 1 wherein said low pressure cavity is interior to said washer and is partially defined by a flat metal portion opposite said mechanical biasing arrangement with said low pressure cavity being located between said mechanical biasing arrangement and said flat metal portion.

11. A seal arrangement as claimed in claim 1 wherein said mechanical biasing arrangement is embedded in said resilient body.

12. A valve comprising a valve housing, a valve member pivotally secured in said valve housing and movable from an open position allowing fluid to pass through said valve to a closed position impending fluid moving through said valve, said valve housing having a peripheral sealing surface which cooperates and forms a seal with the valve member when the valve member is in the closed position, and a washer type seal overlying and on an upstream face of said valve member; said washer type seal having a generally resilient body portion having a forward face and a rearward face having an outer exposed sealing face therebetween in contact with said peripheral sealing surface of said valve housing when said valve member is in the closed position, said forward face being exposed to fluid pressure within said housing, said rearward face cooperating with said valve member to define a low pressure cavity therebetween wherein different pressure differentials are created when said forward face is exposed to different fluid pressures within the valve housing, exceeding the pressure of the low pressure cavity; said washer including a mechanical biasing arrangement of a material different than said resilient body located between the forward face and the rearward face and extending about a length thereby said mechanical biasing arrangement, when exposed to any of the pressure differentials and when said valve member is in the closed position, resiliently distorts along said length thereby and moves in a predetermined directed manner towards said sealing face and thereby exerts a greater force on said sealing face increasing the sealing effect between said sealing face and said peripheral sealing surface of said valve housing, such that the sealing effect increases as the mechanical biasing arrangement continues to distort along said length thereof in the predetermined directed manner caused by increases in the fluid pressure exposed to said forward face, said mechanical biasing arrangement being selected to determine the sealing effect at any of the pressure differentials.

13. A valve as claimed in claim 12 wherein said mechanical arrangement has bowed or distorted finger sections which cooperate with the low pressure cavity therebehind to distort, when exposed to increasing fluid pressure, in a direction to flatten said bowed or distorted sections.

14. A valve as claimed in claim 13 wehrein said mechanical biasing arrangement is made up of a multiplicity of separate finger sections radially disposed about said washer type seal.

15. A valve as claimed in claim 14 wherein said mechanical biasing arrangements is embedded in resilient body.

16. A valve as claimed in claim 14 wherein said finger sections of said mechanical biasing arrangement are of metal, which, in an unstressed state of said washer type seal, have said bowed or distorted sections shaped as a 'V' shape.

17. A valve as claimed in claim 16 wherein said low pressure cavity is interior to said washer and is partially defined by a flat metal portion opposite said mechanical biasing arrangement with said low pressure cavity being located between said mechanical biasing arrangement and said flat metal portion.

18. A valve as claimed in claim 16 wherein said mechanical biasing arrangements is embedded in resilient body.

19. A valve as claimed in claim 12 wherein said low pressure cavity is interior to said washer and is partially defined by a flat metal portion opposite said mechanical biasing arrangement with said low pressure cavity being located between said mechanical biasing arrangement and said flat metal portion.

20. A valve as claimed in claim 19 wherein said mechanical biasing arrangements is embedded in resilient body.

* * * * *